US011901615B2

(12) United States Patent
Chen et al.

(10) Patent No.: US 11,901,615 B2
(45) Date of Patent: Feb. 13, 2024

(54) COMMUNICATION BASE STATION

(71) Applicant: Huawei Technologies Co., Ltd., Shenzhen (CN)

(72) Inventors: Shineng Chen, Shanghai (CN); Dezheng Liu, Shanghai (CN); Feng Peng, Shanghai (CN); Jin Jiang, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 17/589,380

(22) Filed: Jan. 31, 2022

(65) Prior Publication Data

US 2022/0158332 A1 May 19, 2022

Related U.S. Application Data

(63) Continuation of application No. PCT/CN2019/098722, filed on Jul. 31, 2019.

(51) Int. Cl.
*H01Q 1/24* (2006.01)
*H01Q 1/38* (2006.01)
(Continued)

(52) U.S. Cl.
CPC ............... *H01Q 1/246* (2013.01); *H01Q 1/38* (2013.01); *H01Q 1/40* (2013.01); *H01Q 1/42* (2013.01); *H01Q 1/526* (2013.01)

(58) Field of Classification Search
CPC ............ H01Q 1/246; H01Q 1/42; H01Q 3/24; H01Q 3/26–32; H01Q 1/521–526; H01Q 21/30
See application file for complete search history.

(56) References Cited

U.S. PATENT DOCUMENTS 6,072,439 A * 6/2000 Ippolito ................. H01Q 1/246 343/797
8,422,232 B2 4/2013 Kwak et al.
(Continued)

FOREIGN PATENT DOCUMENTS

CN 101807930 A 8/2010
CN 202282872 U 6/2012
(Continued)

*Primary Examiner* — Hasan Islam
(74) *Attorney, Agent, or Firm* — Leydig, Voit & Mayer, Ltd.

(57) ABSTRACT

The present invention discloses a base station, including a radome, a radiator, and an adapter board. The adapter board includes a first board surface and a second board surface that are disposed oppositely, the radome is fastened to the first board surface, a first cavity configured to accommodate an antenna component of the communication base station is formed between the radome and the adapter board, the radiator includes a mounting surface and a side wall that are neighboring to each other, a second cavity configured to accommodate a radio frequency component of the communication base station is recessed on the mounting surface, the mounting surface is fixedly connected to the second board surface, the second cavity is communicated with the first cavity, a connector configured to communicate the radio frequency component with an external circuit is mounted on the side wall, and is electrically connected to the radio frequency component.

10 Claims, 4 Drawing Sheets

(51) Int. Cl.

| | |
|---|---|
| ***H01Q 1/40*** | (2006.01) |
| ***H01Q 1/42*** | (2006.01) |
| ***H01Q 1/52*** | (2006.01) |

(56) References Cited

U.S. PATENT DOCUMENTS

| | | | |
|---|---|---|---|
| 2008/0252552 | A1 | 10/2008 | Goebel et al. |
| 2011/0032158 | A1 | 2/2011 | Rodger et al. |
| 2014/0313095 | A1 | 10/2014 | Pu et al. |
| 2017/0223868 | A1 | 8/2017 | Zheng et al. |

FOREIGN PATENT DOCUMENTS

| | | | |
|---|---|---|---|
| CN | 102696150 | A | 9/2012 |
| CN | 102395226 | B | 10/2014 |
| EP | 1073142 | A2 | 1/2001 |
| JP | 2018014633 | A | 1/2018 |
| WO | 2018198078 | A1 | 11/2018 |

* cited by examiner

--Prior Art--

COMMUNICATION BASE STATION

CROSS-REFERENCE TO RELATED APPLICATIONS

This application is a continuation of International Application No. PCT/CN2019/098722, filed on Jul. 31, 2019, which is hereby incorporated by reference in its entirety.

TECHNICAL FIELD

This application relates to the field of communication technologies, and in particular, to a communication base station.

BACKGROUND

With development and promotion of 5G technologies (fifth generation mobile communication technologies), base station antenna devices, which are important support for wireless information transmission, are widely used. AAU (Active Antenna Unit) series base stations are new base stations that integrate radio frequency and antennas based on an AAS (Active Antenna System) technology. An AAU module mainly includes a passive antenna and an active radio frequency portion. With development of technologies and changes in working environments, the passive antenna and the active radio frequency portion both have changed in sizes and structures. Therefore, how to coordinate structure assemblies of the passive antenna and the active radio frequency portion when a communication base station is being designed becomes a key point of a product design.

SUMMARY

A technical problem to be resolved in the present invention is to provide a communication base station to coordinate an assembly relationship between a passive antenna and an active radio frequency portion in a changing requirement on sizes.

An embodiment of this application provides a communication base station. The communication base station includes: a radome, a radiator, and an adapter board, where the adapter board includes a first board surface and a second board surface that are disposed oppositely, the radome is fastened to the first board surface, a first cavity configured to accommodate an antenna component of the communication base station is formed between the radome and the adapter board, the radiator includes a mounting surface and a side wall that are neighboring to each other, a second cavity configured to accommodate a radio frequency component of the communication base station is recessed on the mounting surface, the mounting surface is fixedly connected to the second board surface, the second cavity is communicated with the first cavity, a connector is mounted at a position on the side wall close to the mounting surface, and the connector is electrically connected to the radio frequency component. For example, a radio frequency device in the radio frequency component is mounted on a circuit board, the connector is also connected to the circuit board, and the connector is electrically connected to the radio frequency device through a circuit line. In the communication base station in this embodiment, an adapter board is designed between the radome and the radiator, so that sizes of the radome and the radiator may be designed based on respective performance requirements. This avoids inconvenience in production and assembly processes. For example, in the production process, because an edge of the radiator is not blocked by any mechanical part (such as a water-proof edge), when a screw hole (where the screw hole is configured to mount the connector) at a position on the side wall of the radiator close to the mounting surface is processed, an operation of a machining tool is facilitated. In addition, in the assembly process, mounting of the connector on the radiator is also facilitated. In this way, assembly of the radiator and the connector is very convenient.

In an embodiment, the adapter board is provided with a through hole for communicating the first cavity with the second cavity, and a projection area of the second cavity on the adapter board is greater than or equal to a hole area of the through hole. The antenna component accommodated in the first cavity needs to be electrically connected to the radio frequency component accommodated in the second cavity. Therefore, the through hole needs to be provided on the adapter board to implement an electrical connection between the two components.

For example, the radio frequency device in the radio frequency component is mounted on the circuit board, the circuit board is provided with the connector, and the connector is electrically connected to the antenna component through a transmission line.

In an embodiment, a shielding structure is disposed in the second cavity and is configured to wrap and shield the radio frequency component. The shielding structure is designed to block mutual electromagnetic interference between radio frequency components and between the radio frequency component and the antenna component, to improve working performance of the communication base station.

In an embodiment, the shielding structure is a shielding case, the shielding case is buckled on an inner bottom surface of the radiator, and the radio frequency component is accommodated in a shielding space formed by the shielding case and the inner bottom surface. In this implementation, the radiator is used as a part of the shielding structure. The radiator is made of a material having a shielding function, and is combined with the shielding case to form the shielding space.

In an embodiment, the shielding structure is a shielding board, the shielding board is attached to the second board surface, and the radio frequency component is accommodated in a shielding space formed by the shielding board and an inner surface of the radiator. An attached shielding board is designed on the second board surface to shield the through hole and form a shielding cavity. Such a design can be manufactured conveniently and facilitate assembly of the antenna and base station.

In an embodiment, the shielding structure is a shielding board, the shielding board is connected to an inner side face of the second cavity, and the radio frequency component is accommodated in a shielding space formed by the shielding board and an inner surface of the radiator. A metal plate is used to form a shielding board to shield the radio frequency component. A structure is simple, processing is convenient, and manufacturing costs are low.

In an embodiment, a water-proof rubber strip is disposed between the first board surface and the radome and a water-proof rubber strip is disposed between the second board surface and the radiator. The antenna base station in this embodiment may be widely used in outdoor spaces. Therefore, the product needs to have waterproof performance to avoid impact of rain on device performance. Therefore, when the board surfaces are attached to each other, the water-proof rubber strip needs to be added to avoid damage caused by a water leakage at a connection position to electric elements in the first cavity and the second cavity.

In an embodiment, the adapter board is provided with a plurality of first screw holes and a plurality of second screw holes, which are configured to detachably connect the radome and the radiator to the adapter board. The radome and the radiator are detachably mounted on two sides of the adapter board by using screw threads. A mounting operation is simple, and manufacturing costs are also low.

In an embodiment, the plurality of first screw holes are distributed on an edge of the adapter board, and the radome is mounted in cooperation with the plurality of first screw holes. The first screw holes are adapted to mount the radome in cooperation with the adapter board. A size of the radome is determined by a size of the antenna component. Therefore, when the radome is mounted in cooperation with the adapter board, the size of the adapter board can be determined only based on the size of the radome. The first screw holes are distributed on the edge of the adapter board, that is, the radome is buckled on the edge of the adapter board to make a product structure design as small as possible.

In an embodiment, the plurality of second screw holes are distributed around the through hole, and the radiator is mounted in cooperation with the plurality of second screw holes. The radiator is connected to the adapter board through the plurality of second screw holes and by using screw threads. This may be understood as that a region surrounded by the second screw holes is a region on the second board surface on which the radiator is projected. To miniaturize a product structure, a projection of the radiator on the second board surface also needs to be greater than the through hole. Therefore, the region surrounded by the second screw holes needs to be greater than the through hole, in other words, the plurality of second screw holes are distributed around the through hole.

BRIEF DESCRIPTION OF DRAWINGS

To describe technical solutions in embodiments of this application or in the background more clearly, the following describes the accompanying drawings used in describing the embodiments of this application or the background.

DESCRIPTION OF EMBODIMENTS

The following describes embodiments of this application with reference to the accompanying drawings in the embodiments of this application.

Figure 1:
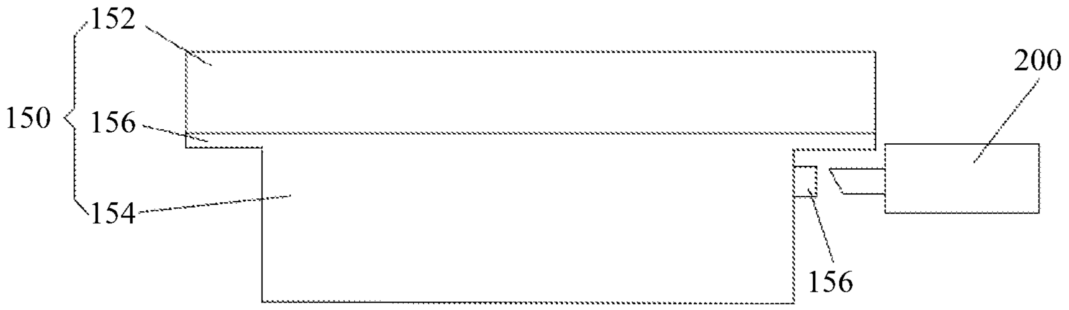
FIG. 1 is a schematic diagram of a structure of a communication base station according to a conventional technology.

With development of communication technologies, especially maturation of 5G technologies, applications thereof also provide new requirements for communication base stations, and miniaturized base stations become a mainstream of future communication products. FIG. 1 shows a common communication base station 150. The communication base station 150 mainly includes a passive antenna portion 152 and an active radio frequency portion 154. The passive antenna portion 152 is configured to receive and send a communication signal. The active radio frequency portion 154 may include a power amplifier, a harmonic circuit, and the like; and is configured to process the communication signal. To enable the communication base station 150 to communicate with an external signal, a connector 156 is usually further disposed. The connector 156 is electrically connected to another communication device through a communication cable. As the 5G technologies become mature, an integration degree of the active radio frequency portion 154 becomes higher and a size becomes smaller. However, as another important part of the antenna base station 150, a size of the passive antenna portion 152 at a specific frequency band basically remains unchanged due to limitations of an antenna gain and a physical size requirement. This poses a challenge to the structural design of the communication base station 150. Because the size of the passive antenna portion 152 is relatively fixed and the size of the active radio frequency portion 154 becomes smaller as the technologies become mature, a T-shaped structure similar to that in FIG. 1 is formed. An integrated water-proof edge 156 is disposed at a connection position between the active radio frequency portion 154 and the passive antenna portion 152 and is configured to mount the passive antenna portion 152. The passive antenna portion 152 is like a hat covering the active radio frequency portion 154. Such a structure causes a problem that in a production process, when a screw hole configured to fasten the connector 156 to the active radio frequency portion 154 is processed, an operation of a machining tool is not convenient due to existence of the water-proof edge 156, processing efficiency is low, and a success rate is low. In addition, in a process of mounting the connector 156 to the active radio frequency portion 154, an operation is not convenient, and assembly efficiency is low.

Figure 2:
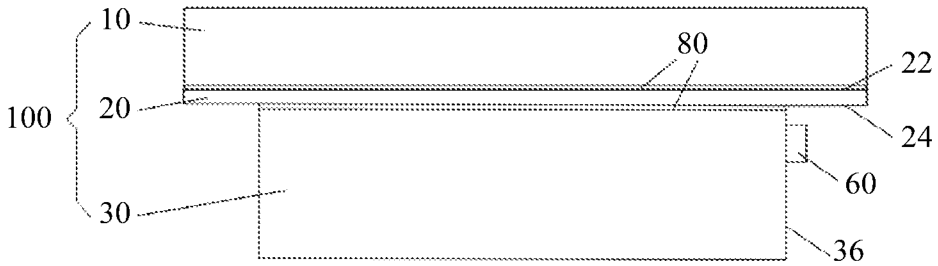
FIG. 2 is a main view of a communication base station according to an embodiment of this application.
Figure 3:
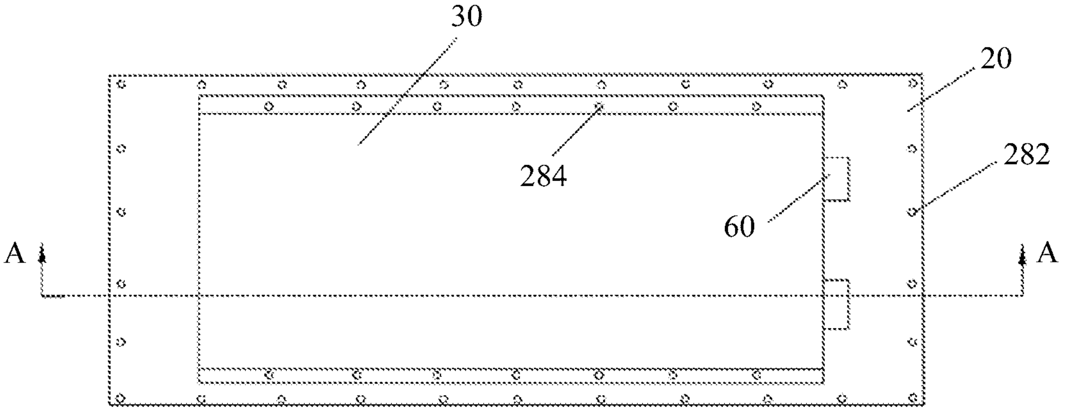
FIG. 3 is a bottom view of a communication base station according to an embodiment of this application.
Figure 5:
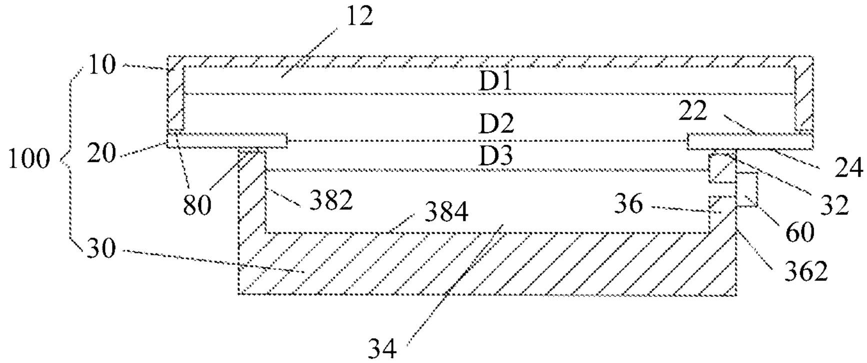
FIG. 5 is a sectional view of a communication base station without a working component taken along an A-A line according to a first implementation of this application.
Figure 6:
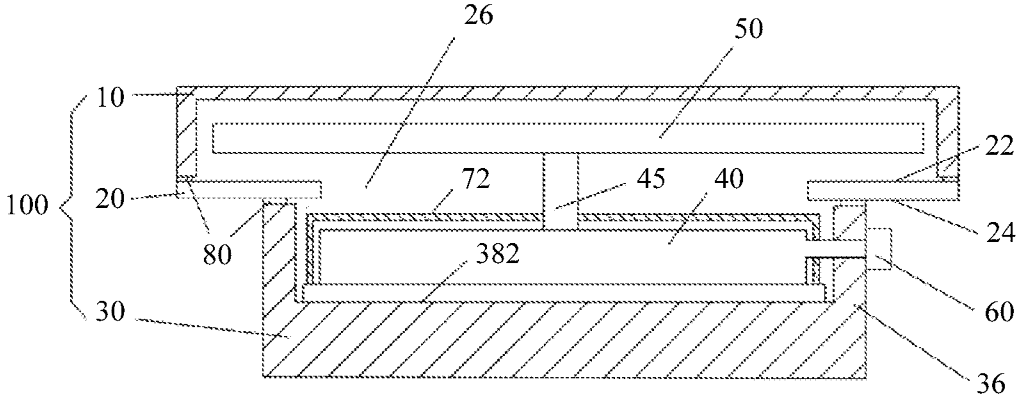
FIG. 6 is a sectional view of a communication base station according to a first implementation of this application.

In view of this, this application provides a communication base station 100. As shown in FIG. 2 and FIG. 3, the communication base station 100 mainly includes a radome 10, an adapter board 20, and a radiator 30 from top to bottom. The adapter board 20 and the radiator 30 are independent of each other. The adapter board 20 includes a first board surface 22 and a second board surface 24. As shown in FIG. 5 and FIG. 6, similar to a cover without a bottom, the radome 10 is buckled to the first board surface 22 to form a first cavity 12 configured to accommodate an antenna component 50 of the communication base station 100. A surface of the radiator 30 facing the second board surface 24 of the adapter board 20 is a mounting surface 32. The mounting surface 32 is attached to the second board surface 24. A part of the mounting surface 32 is recessed along a direction away from the adapter board 20 to form a second cavity 34 configured to accommodate a radio frequency component 40 of the communication base station 100.

The radiator 30 includes a mounting surface 32 and an outer side wall 362 that are neighboring to each other. The mounting surface 32 is formed on the side wall 36 and is a surface that is of the first side wall 36 and that faces the second board surface 24. A connector 60 is mounted on the side wall 36 of the radiator 30. The connector 60 is located at a position on the outer side wall 362 close to the mounting surface 32. The connector 60 is electrically connected to the radio frequency component 40 and is configured to communicate the radio frequency component 40 with an external circuit (not shown in the figure). Specifically, a radio frequency device in the radio frequency component is mounted on a circuit board, the connector is also connected to the circuit board, and the connector is electrically connected to the radio frequency device through a circuit line. In the communication base station 100 in this embodiment, the adapter board 20 is disposed between the radome 10 and the radiator 30. In a production process, a screw hole configured to fasten the connector 60 is processed on the radiator 30 first. In an assembly process, an operator first mounts the connector 60 on the radiator 30, and then fastens the adapter board 20 to the radiator 30. Specifically, the radiator 30 is mounted on the second board surface 24 of the adapter board 20 first; and then, the radome 10 is mounted on the first board surface 22 of the adapter board 20. According to the architecture in this application, in the production process, because an edge of the radiator 30 is not blocked by any mechanical part (such as a water-proof edge), when a screw hole (where the screw hole is configured to mount the connector) at a position on the side wall of the radiator 30 close to the mounting surface is processed, an operation of a machining tool is facilitated. In addition, in the assembly process, mounting of the connector 60 on the radiator 30 is also facilitated. In this way, assembly of the radiator 30 and the connector 60 is very convenient.

Figure 4:
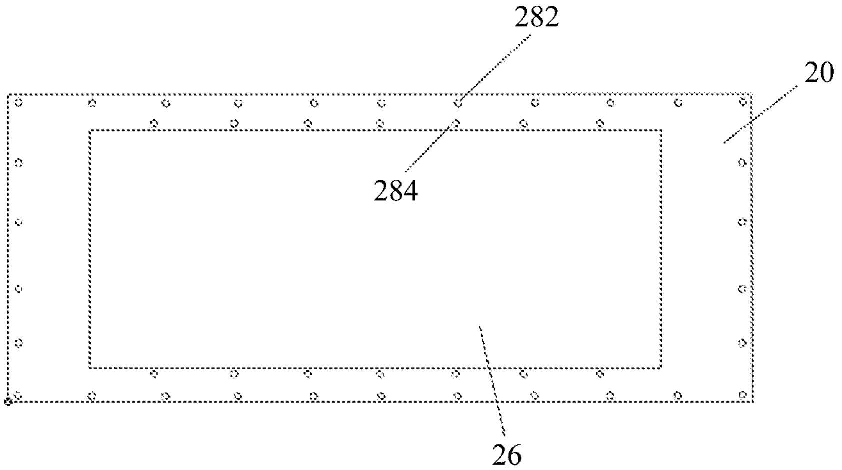
FIG. 4 is a schematic diagram of a structure of an adapter board of a communication base station according to an embodiment of this application.

In an embodiment, as shown in FIG. 4 and FIG. 6, a part of the adapter board 20 is hollowed out to form a through hole 26 for communicating the first cavity 12 with the second cavity 34. For the communication base station 100, the antenna component 50 and the radio frequency component 40 need to exchange signals and are communicated with each other through a corresponding circuit. Therefore, the through hole 26 needs to be provided on the adapter board 20. The two components are electrically connected through a connection line 45.

In an embodiment, as shown in FIG. 4, the adapter board 20 is provided with a plurality of first screw holes 282 and a plurality of second screw holes 284, which are configured to detachably connect the radome 10 and the radiator 30 to the adapter board 20. The radome 10 and the radiator 30 are detachably mounted on two sides of the adapter board 20 by using screw threads. A mounting operation is simple, and manufacturing costs are also low.

In a specific embodiment, the plurality of first screw holes 282 are distributed on an outer edge of the adapter board 20, the radome 10 is mounted in cooperation with the plurality of first screw holes 282, the plurality of second screw holes 284 are distributed around the through hole 26, and the radiator 30 is mounted in cooperation with the plurality of second screw holes 284. The first screw holes 282 are configured to mount the radome 10 in cooperation with the adapter board 20. A size of the radome 10 is determined by a size of the antenna component 50. Therefore, when the radome 10 is mounted in cooperation with the adapter board 20, the size of the adapter board 20 can be determined only based on the size of the radome 10. The first screw holes 282 are distributed on the edge of the adapter board 20, that is, the radome 10 is buckled on the edge of the adapter board 20 to make a product structure design as small as possible. Similarly, the radiator 30 is connected to the adapter board 20 through the plurality of second screw holes 284 and by using screw threads. This may be understood as that a region surrounded by the second screw holes 284 is a region on the second board surface 24 on which the radiator 30 is projected. To miniaturize a product structure, a projection of the radiator 30 on the second board surface 24 also needs to be greater than the through hole 26. Therefore, the region surrounded by the second screw holes 284 needs to be greater than the through hole 26, in other words, the plurality of second screw holes 284 are distributed around the through hole 26.

In an embodiment, as shown in FIG. 5 and FIG. 6, widths of the radome 10, the adapter board 20, and the radiator 30 are equivalent. Therefore, to compare sizes of projection areas of corresponding structures on the adapter board 20, lengths D (shown as D1, D2, and D3 in the figure) are used as substitutes. Sizes of D in the sectional view are compared to show the sizes of the projection areas corresponding to the structures. In this embodiment, a projection of the first cavity 12 on the adapter board 20 is greater than a projection of the second cavity 34 on the adapter board 20. As specified above, the length D1 of the first cavity 12 is greater than the length D3 of the second cavity 34 in the figure. As can be learned from the foregoing descriptions, the adapter board 20 has a function of separating the radome 10 and the radiator 30, in other words, the radome 10 is fastened to the first board surface 22 of the adapter board 20, and the radiator 30 is fastened to the second board surface 24 of the adapter board 20. In the design of the communication base station 100, a size of the antenna component 50 is determined by an inherent frequency band and a gain effect of communication and is difficult to reduce. This also determines a size of the first cavity 12. However, with development of communication technologies, a module integration degree of the radio frequency component 40 becomes higher, and a size of the radio frequency component 40 also becomes smaller, that is, the second cavity 34 configured to accommodate the radio frequency component 40 may be miniaturized. Therefore, sizes of projections of the first cavity 12 and the second cavity 34 that are separately located on two sides of the adapter board 20 need to be different on the adapter board 20, to ensure a miniaturization design of the entire communication base station 100.

Figure 7:
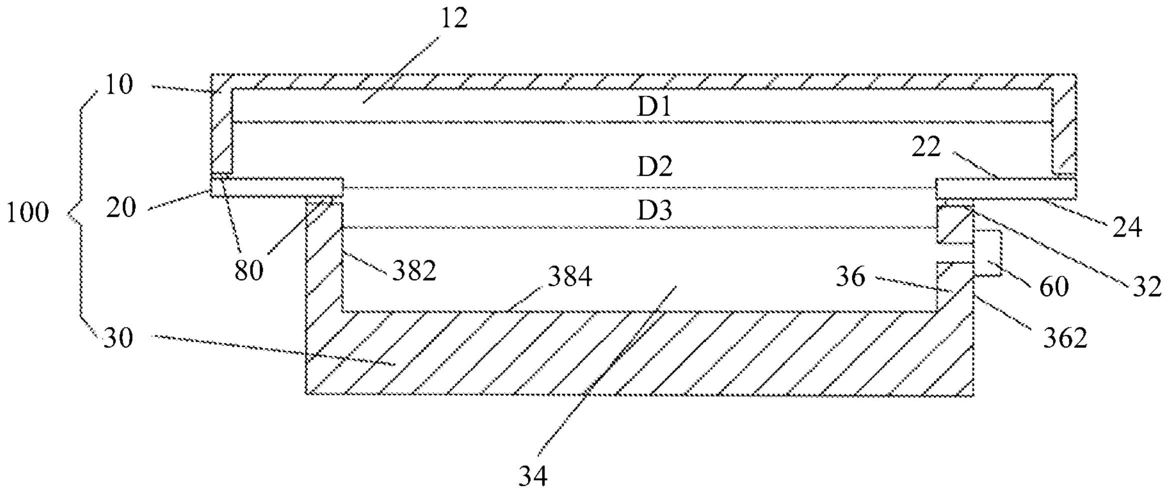
FIG. 7 is a sectional view of a communication base station without a working component according to a second implementation of this application.
Figure 8:
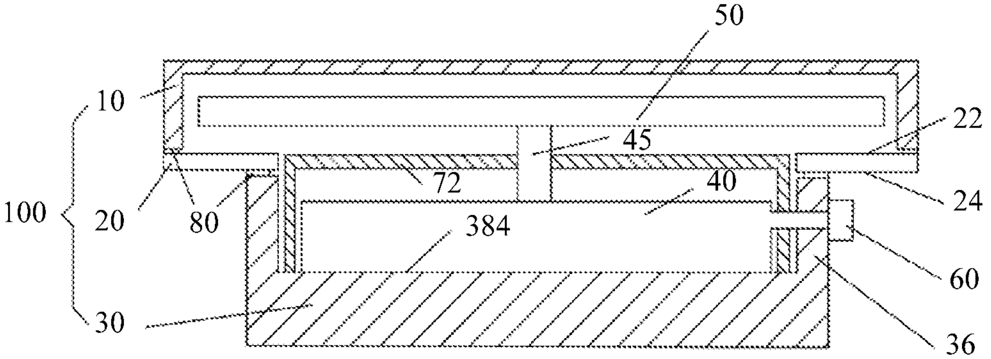
FIG. 8 is a sectional view of a communication base station according to a second implementation of this application.

In an embodiment, as shown in FIG. 7 and FIG. 8, a projection area of the second cavity 34 on the adapter board 20 is equal to a hole area of the through hole 26, that is, the length D3 of the second cavity 34 is equal to the length D2 of the through hole 26 in the figure. Because the mounting surface 32 of the radiator 30 is in contact with the second board surface 24, to fasten the radiator 30 to the second board surface 24, a size of the second cavity 34 cannot be less than a size of the through hole 26. Otherwise, the mounting surface 32 cannot be attached to the second board surface 24 normally. It should be noted that to miniaturize the entire product, when the radio frequency component 40 becomes small, the size of the second cavity 34 is reduced accordingly. If the size of the radio frequency component 40 is less than the size of the through hole 26, to ensure normal attachment between the mounting surface 32 and the second board surface 24, a projection area of the second cavity 34 can only be equal to the hole area of the through hole 26 and cannot be equal to the radio frequency component 40 with a smaller size.

In an embodiment, as shown in FIG. 5 and FIG. 6, a projection area of the second cavity 34 on the adapter board 20 is greater than a hole area of the through hole 26, that is, the length D3 of the second cavity 34 is greater than the length D2 of the through hole 26 in the figure. Because the mounting surface 32 of the radiator 30 is in contact with the second board surface 24, to fasten the radiator 30 to the second board surface 24, a size of the second cavity 34 cannot be less than a size of the through hole 26. Otherwise, the mounting surface 32 cannot be attached to the second board surface 24 normally. Herein, a purpose of setting the projection area of the second cavity 34 greater than the hole area of the through hole 26 is to make the size of the second cavity 34 irrelevant to the through hole 26. A more important point is a size of the radio frequency component 40. When the size of the radio frequency component 40 is greater than the size of the through hole 26, a projection area of the second cavity 34 for accommodating the radio frequency component 40 on the second board surface 24 is definitely greater than the hole area of the through hole 26.

In an embodiment, as shown in FIG. 6, FIG. 8, FIG. 9, and FIG. 10, a shielding structure is disposed in the second cavity 34 and is configured to wrap and shield the radio frequency component 40. The shielding structure is designed to block electromagnetic interference from the radio frequency component 40 to the antenna component 50, to improve working performance of the antenna component 50.

In a specific embodiment, as shown in FIG. 6, the shielding structure disposed in the second cavity 34 is a shielding case 72. The shielding case 72 is configured to shield the radio frequency device on the circuit board of the radio frequency component 40.

In an embodiment, the shielding case 72 is buckled to an inner bottom surface 382 of the radiator 30 to form a shielding space (as shown in FIG. 8). In this case, a size of the shielding space is determined by the shielding case 72, and a size of the shielding case 72 may be adjusted based on the radio frequency component 40.

In a situation, as shown in FIG. 6, the radio frequency component 40 is large. As a result, the projection of the second cavity 34 on the adapter board 20 is greater than the through hole 26. Therefore, in this case, a height of the shielding case 72 cannot be higher than a height of the second cavity 34. In another situation, as shown in FIG. 8, the size of the radio frequency component 40 is small. As a result, the projection area of the second cavity 34 on the adapter board 20 is equal to the hole area of the through hole 26. Therefore, in this case, a height of the shielding case 72 can be higher than a height of the second cavity 34. In addition, when the shielding case 72 is used as the shielding structure, shielding effects in different directions of the radio frequency component 40 are the same.

Figure 9:
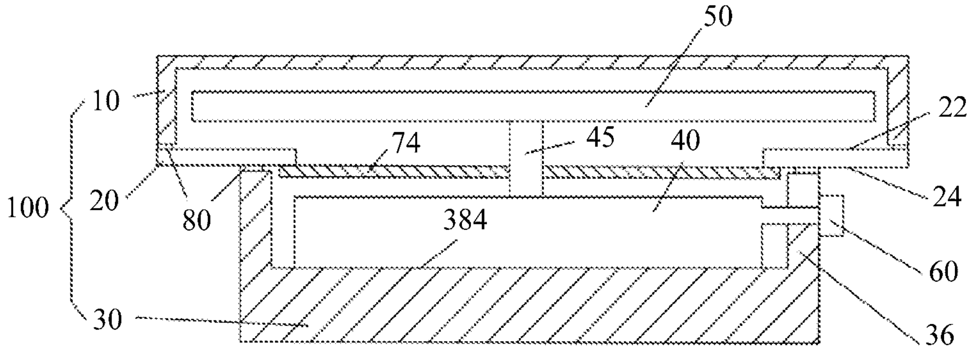
FIG. 9 is a sectional view of a communication base station according to a third implementation of this application.

In a specific embodiment, as shown in FIG. 9, the shielding structure is a shielding board 74. The shielding board 74 is attached to the second board surface 24, and the radio frequency component 40 is accommodated in a shielding space formed by the shielding board 74 and an inner surface 38 of the radiator 30. An attached shielding board 74 is designed on the second board surface 24 to shield the through hole 26 and form a shielding cavity. Such a design can be manufactured conveniently and facilitate assembly of the antenna base station 100.

Figure 10:
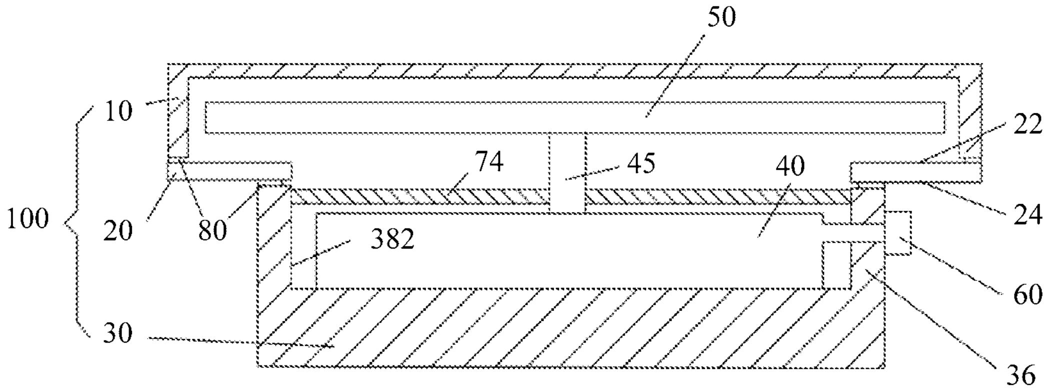
FIG. 10 is a sectional view of a communication base station according to a fourth implementation of this application.

In a specific embodiment, as shown in FIG. 10, the shielding structure is a shielding board 74, the shielding board 74 is connected to an inner side face 384 of the second cavity 34, and the radio frequency component 40 is accommodated in a shielding space formed by the shielding board 74 and an inner surface 38 of the radiator 30. A metal plate is used to form a shielding board 74 to shield the radio frequency component 40. A structure is simple, processing is convenient, and manufacturing costs are low.

In an embodiment, as shown in FIG. 2, a water-proof rubber strip 80 is disposed between the first board surface 22 and the radome 10 and a water-proof rubber strip 80 is disposed between the second board surface 24 and the radiator 30. The antenna base station 100 in this embodiment may be widely used in outdoor spaces. Therefore, the product needs to have waterproof performance to avoid impact of rain on device performance. Therefore, when the board surfaces are attached to each other, the water-proof rubber strip 80 needs to be added to avoid damage caused by a water leakage at a connection position to electric elements in the first cavity 12 and the second cavity 34.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The communication base station provided in the embodiments of this application is described in detail above. The principle and embodiments of this application are described herein through specific examples. The description about the embodiments is merely provided to help understand the method and core ideas of this application. In addition, a person of ordinary skill in the art can make variations and modifications to this application in terms of the specific embodiments and application scopes according to the ideas of this application. Therefore, the content of specification shall not be construed as a limit to this application.

What is claimed is:

1. A base station, comprising:

a radome, a radiator, and an adapter board, wherein the adapter board comprises a first board surface and a second board surface, wherein the first board surface is disposed oppositely to the second board surface, the radome is fastened to the first board surface, a first cavity configured to accommodate an antenna component of the base station is formed between the radome and the adapter board, the radiator comprises a mounting surface and a side wall that are neighboring to each other, a second cavity configured to accommodate a radio frequency component of the base station is recessed on the mounting surface, the mounting surface is fixedly connected to the second board surface, the second cavity is connected with the first cavity, a connector is mounted at a position on the side wall close to the mounting surface, and the connector is electrically connected to the radio frequency component.

2. The base station according to claim 1, wherein the adapter board is provided with a through hole for communicating between the first cavity with the second cavity, and a projection area of the second cavity on the adapter board is greater than or equal to a hole area of the through hole.

3. The base station according to claim 1, wherein a shielding structure is disposed in the second cavity and is configured to wrap and shield the radio frequency component.

4. The base station according to claim 3, wherein the shielding structure is a shielding case, the shielding case is buckled on an inner bottom surface of the radiator, and the radio frequency component is accommodated in a shielding space formed by the shielding case and the inner bottom surface.

5. The base station according to claim 3, wherein the shielding structure is a shielding board, the shielding board is attached to the second board surface, and the radio frequency component is accommodated in a shielding space formed by the shielding board and an inner surface of the radiator.

6. The base station according to claim 3, wherein the shielding structure is a shielding board, the shielding board is connected to an inner side face of the second cavity, and the radio frequency component is accommodated in a shielding space formed by the shielding board and an inner surface of the radiator.

7. The base station according to claim 1, wherein a water-proof rubber strip is disposed between the first board surface and the radome and a water-proof rubber strip is disposed between the second board surface and the radiator.

8. The base station according to claim 1, wherein the adapter board is provided with a plurality of first screw holes configured to detachably connect the radome to the adapter board.

9. The base station according to claim 8, wherein the plurality of first screw holes are distributed on an outer edge of the adapter board, and the radome is mounted in cooperation with the plurality of first screw holes.

10. The base station according to claim 8, wherein the adapter board is provided with a plurality of second screw holes configured to detachably connect the radiator to the adapter board, wherein the plurality of second screw holes are distributed around the through hole, and the radiator is mounted in cooperation with the plurality of second screw holes.

* * * * *